(12) United States Patent
Uhkoetter et al.

(10) Patent No.: US 11,326,555 B2
(45) Date of Patent: May 10, 2022

(54) GEAR AND GAS TURBINE ENGINE

(71) Applicant: Rolls-Royce Deutschland Ltd & Co KG, Blankenfelde-Mahlow (DE)

(72) Inventors: Stephan Uhkoetter, Berlin (DE); Uwe Kracht, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 64 days.

(21) Appl. No.: 16/358,189

(22) Filed: Mar. 19, 2019

(65) Prior Publication Data

US 2019/0293026 A1 Sep. 26, 2019

(30) Foreign Application Priority Data

Mar. 20, 2018 (DE) .............. 10 2018 106 572.8
Mar. 15, 2019 (DE) .............. 10 2019 106 633.6

(51) Int. Cl.
*F02K 3/12* (2006.01)
*F02C 7/36* (2006.01)
(Continued)

(52) U.S. Cl.
CPC .............. *F02K 3/12* (2013.01); *F01D 25/18* (2013.01); *F02C 6/00* (2013.01); *F02C 7/36* (2013.01);
(Continued)

(58) Field of Classification Search
CPC ...... F02K 3/12; F02C 6/00; F02C 7/36; F01D 25/18; F16H 1/28; F16H 57/043;
(Continued)

(56) References Cited

U.S. PATENT DOCUMENTS 3,539,035 A    11/1970    Wolkenstein
4,667,774 A *    5/1987    Roberge .............. F16H 1/14
                                                              184/6.12

(Continued)

FOREIGN PATENT DOCUMENTS

DE          1650681         11/1970
JP          2012202449 A   *   10/2012
WO        2017046481 A1      3/2017

OTHER PUBLICATIONS

German Search Report dated Nov. 27, 2018 from counterpart German App No. 102018106572.8.

*Primary Examiner* — Justin D Seabe
*Assistant Examiner* — Eric A Lange
(74) *Attorney, Agent, or Firm* — Shuttleworth & Ingersoll, PLC; Timothy J. Klima (57) ABSTRACT

A gearbox for a gas turbine engine with a rotatably mounted structural component that is formed with an at least approximately rotationally symmetrical duct into which, starting from its radially inner area, oil from an oil supply which is fixedly attached at the housing can be introduced. Starting from the oil supply, an introduction direction of the oil into the duct encloses an angle of 90° or an angle of between 60° and 90° with the axial extension direction of the duct. Additionally, in the circumferential direction of the duct, the introduction direction of the oil encloses an angle with the radial extension direction that is larger than or equal to 0° and smaller than 90°.

16 Claims, 2 Drawing Sheets

(51) Int. Cl.
    *F02C 6/00*      (2006.01)
    *F01D 25/18*     (2006.01)
    *F16H 1/28*      (2006.01)
    *F16H 57/04*     (2010.01)

(52) U.S. Cl.
    CPC ............. *F16H 1/28* (2013.01); *F16H 57/043* (2013.01); *F16H 57/046* (2013.01); *F16H 57/0486* (2013.01); *F05D 2220/36* (2013.01); *F05D 2260/40311* (2013.01); *F05D 2260/98* (2013.01)

(58) Field of Classification Search
    CPC .. F16H 57/046; F16H 57/0486; F16H 57/042; F16H 57/0456; F05D 2220/36; F05D 2260/40311; F05D 2260/98; F05D 2260/602
    See application file for complete search history.

(56) References Cited

U.S. PATENT DOCUMENTS

| | | | | |
|---|---|---|---|---|
| 5,242,033 A | * | 9/1993 | Toraason | ............ F16H 57/0412 184/6.12 |
| 2011/0299974 A1 | * | 12/2011 | Gauthier | ................ F02C 3/107 415/122.1 |
| 2016/0377165 A1 | | 12/2016 | Sheridan | |
| 2016/0377167 A1 | * | 12/2016 | Sheridan | ............. F16H 57/0486 60/226.1 |
| 2018/0258794 A1 | | 9/2018 | Gedin et al. | |

\* cited by examiner

GEAR AND GAS TURBINE ENGINE

This application claims priority to German Patent Application DE102018106572.8 filed Mar. 20, 2018 and German Patent Application DE102019106633.6 filed Mar. 15, 2019. The entirety of both applications are incorporated by reference herein.

The present disclosure relates to a gearbox with a rotatably mounted structural component that is formed with a rotationally symmetrical duct. Further, the present disclosure relates to a gas turbine engine for an aircraft.

A gearbox of a jet engine is known from practice. The gearbox comprises a sun gear, a ring gear fixedly attached at the housing, and a rotatable planetary carrier via which a fan can be driven. Multiple planetary gears are in engagement with the sun gear and the ring gear. Via a collecting duct that is connected to the planetary carrier of the gearbox, oil is conducted in the direction of the tooth meshings between the planetary gears and the ring gear. The collecting duct extends in the circumferential direction of the planetary carrier and is embodied to be open radially inside. Via the radially inner opening, oil is introduced via a supply feed.

However, the oil that is guided into the collecting duct is disadvantageously not accelerated to the degree which is necessary for further conduction in the direction of the planetary gear bearings inside the collecting duct. As a result, there is the danger of an undersupply to the planetary gear bearings as well as to the area of the tooth meshings between the structural components of the gearbox. Among other things, this is due to the fact that the wall friction between the collecting duct and the oil which is introduced into the collecting duct is not sufficient to accelerate the oil inside the collecting duct in the radial direction towards the direction of the planetary gear bearings.

What is to be provided is a gearbox and a gas turbine engine with a gearbox in which the oil supply of a rotatable structural component of the gearbox is respectively ensured.

This objective is achieved through a gearbox and a gas turbine engine with features as disclosed herein.

Provided according to a first aspect is a gearbox with a rotatably mounted structural component that is formed with an at least approximately rotationally symmetrical duct. Starting from a radially inner area, oil can be guided into the duct from an oil supply that is fixedly attached at the housing. Starting from the oil supply, an introduction direction of the oil into the duct encloses an angle in a range between 45° and 90° with the radial extension direction of the duct. Alternatively, there is also the possibility that, starting from the oil supply, the introduction of oil into the duct encloses an angle of between 60° and 90° with the axial extension direction of the duct. Further, the introduction direction of the oil in the circumferential direction of the duct encloses an angle with the radial extension direction that is larger than or equal to 0° and smaller than 90°.

In this manner, an impulse is applied to the oil when it is introduced into the duct from the oil supply, such that the oil in the duct is accelerated to an extend as it is for example necessary for it to be conducted further in the direction of a bearing of the rotatable structural component, and an undersupply of the bearing or of tooth meshings between structural components of the gearbox is prevented.

What is understood by the term duct in the present case is an outer wall-like boundary that delimits an inner area that is duct-shaped at least in certain areas. Here, the boundary itself is embodied to be at least approximately rotationally symmetrical independently of the installations that are arranged in the inner area of the boundary.

Further, starting from the oil supply, the introduction of the oil into the duct encloses an angle of between 75° and 90°, preferably of between 80° and 90°, with the axial extension direction of the duct. If the extension direction of the oil encloses an angle with the axial extension direction of the duct that is within the last-mentioned angular range, an impulse is applied to the oil already as it is being introduced into the duct. This impulse ensures that the oil is accelerated inside the duct to an extent as it is necessary for further conduction, for example in the direction of a bearing of the rotatable structural component, and an undersupply of the bearing or also of the tooth meshings between structural components of the engine is avoided.

If the duct has at least one outlet opening for the oil in a radially outer area, the oil is accelerated in the direction of the outlet opening by the centrifugal force that is applied to the oil during rotation, and from there is conducted further in the necessary manner in the direction of the areas of the gearbox which are to be impinged with oil, such as a bearing and/or a toothing.

According a further aspect of the present disclosure, the structural component is a rotating shaft, preferably a sun gear, a planetary carrier, a planetary gear and/or a ring gear. In that case, a bearing or a tooth meshing of a planetary gearbox can be supplied with oil to the necessary extent, and a reliable and safe operation of the entire gearbox can be ensured in a constructionally simple manner.

In particular in the case of circumferential planetary gears, a transfer from the stationary oil system to the planetary gears that are rotating about the sun gear of the gearbox is ensured.

The oil supply can comprise an oil nozzle, with its outlet opening being arranged radially and/or axially at a distance to an inlet opening for the oil that is provided in the radially inner area of the duct.

If at least one oil nozzle is present, which in the installation position of the gearbox is arranged centrally inside the radially inner area of the duct, an impulse as it is necessary for a sufficient oil supply to loads of the gearbox can be applied to the oil with small effort as it is introduced into the duct.

If at least two oil nozzles are provided, which in the installation position of the gearbox are respectively arranged between a rotational axis of the duct and the duct as well as centrally inside the radially inner area of the duct, an impulse as it is necessary for a sufficient oil supply to loads of the gearbox can be applied to the oil.

According to a further aspect, at least eight oil nozzles, preferably 10 or more oil nozzles, are provided. Here, it can be provided that, in the installation position of the gearbox, respectively one oil nozzle is arranged between a rotational axis of the duct and the inner radial area of the duct as well as centrally inside the duct, while the further oil nozzles are positioned at a distance to the two oil nozzles in the circumferential direction with respect to the two centrally arranged oil nozzles radially inside the inner area of the duct.

The present disclosure provides a non-closed oil transfer unit that is characterized by a self-adjusting system of nozzles that are arranged across the circumference. Via the oil nozzles, lubricating and cooling agents are sprayed into a rotating duct or groove. A supply pressure is built up inside the rotating collecting groove and where applicable the following distribution lines as a result of the centrifugal force. The non-closed system that comprises the oil nozzles and the collecting duct allows for the possibility of different liquid levels in the rotating system. In turn, the supply pressure in the rotating system depends on the present liquid level. What results is a self-adjusting and robust supply system in which the loads are supplied in a manner that is considerably less dependent on the back pressure. If the back pressure, i.e. the pressure present in the load and the pressure loss to the load is in an acceptable pressure range and accordingly is neither too low nor too high, the adjustment can occur through the liquid level in the rotating supply lines. If the oil volume flow increases, so does the supply pressure, and more oil is pressed in the direction of the loads, such as for example a bearing. In the reverse case, the supply pressure drops if the volume flow decreases. Through a suitably set back pressure, running dry of the oil system is avoided, with a reduced but continuous supply taking place instead.

The gearbox that is introduced here comprises an oil transfer unit without wearing-out contact seals. Further, the gearbox has a self-adjusting system of oil nozzles which are arranged about the circumference of the duct and via which the lubricating and cooling agent or the oil is injected into a rotating collecting duct, in most instances a groove.

As is explained elsewhere herein, the present disclosure may relate to a gas turbine engine. Such a gas turbine engine can comprise an engine core which comprises a turbine, a combustion space, a compressor, and core shaft that connects the turbine to the compressor. Such a gas turbine engine can comprise a fan (with fan blades) that is positioned upstream of the engine core.

Arrangements of the present disclosure may be particularly, although not exclusively, beneficial for fans that are driven by means of a gearbox. Correspondingly, the gas turbine engine may comprise a gearbox that receives an input from the core shaft and outputs drive for the fan for driving the fan with a lower rotational speed than the core shaft. The input to the gearbox may be directly from the core shaft, or indirectly from the core shaft, for example by means of a spur shaft and/or gear. The core shaft may be rigidly connected to the turbine and the compressor, such that the turbine and the compressor rotate at the same rotational speed (with the fan rotating at a lower rotational speed). Here, the gearbox can be embodied as a planetary gearbox as it is described in more detail above.

The gas turbine engine as described and claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by one or multiple shafts, for example the first and/or second shaft in the above example.

In a gas turbine engine as described and claimed herein, a combustion space may be provided axially downstream of the fan and the compressor (or the compressors). For example, the combustion space may be located directly downstream of the second compressor (for example at the exit thereof), if a second compressor is provided. By way of further example, the flow at the exit of the combustor may be provided to the inlet of the second turbine, if a second turbine is provided. The combustion space may be provided upstream of the turbine(s).

The or each compressor (for example the first compressor and the second compressor according to the above description) may comprise any number of stages, for example multiple stages. Each stage may comprise a row of rotor blades and a row of stator vanes, which may be variable stator vanes (i.e. in that their angle of incidence may be variable). The row of rotor blades and the row of stator vanes may be axially offset with respect to each other.

The or each turbine (for example the first turbine and second turbine according to the above description) may comprise any number of stages, for example multiple stages. Each stage may comprise a row of rotor blades and a row of stator vanes. The row of rotor blades and the row of stator vanes may be axially offset with respect to each other.

Each fan blade may be defined with a radial span width extending from a root (or hub) at a radially inner gas-washed location, or from a 0% span position to a tip with a 100% span width. Here, the ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in a closed range bounded by any two values in the previous sentence (i.e., the values may represent upper or lower bounds). These ratios may commonly be referred to as the hub-to-tip ratio. The radius at the hub and the radius at the tip may both be measured at the leading (or the axially forwardmost) edge of the blade. The hub-to-tip ratio refers, of course, to the gas-washed portion of the fan blade, i.e. the portion that is located radially outside any platform.

The radius of the fan may be measured between the engine centerline and the tip of a fan blade at its leading edge. The fan diameter (which may simply be twice the radius of the fan) may be greater than (or on the order of) any of: 250 cm (about 100 inches), 260 cm, 270 cm (about 105 inches), 280 cm (about 110 inches), 290 cm (about 115 inches), 300 cm (about 120 inches), 310 cm, 320 cm (about 125 inches), 330 cm (about 130 inches), 340 cm (about 135 inches), 350 cm, 360 cm (about 140 inches), 370 cm (about 145 inches), 380 (about 150 inches) cm or 390 cm (about 155 inches). The fan diameter may be in a closed range bounded by any two of the values in the previous sentence (i.e. the values may represent upper or lower bounds).

The rotational speed of the fan may vary during use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range from 1700 rpm to 2500 rpm, for example in the range of between 1800 rpm to 2300 rpm, for example in the range of between 1900 rpm to 2100 rpm. Purely by way of further non-limiting example, the rotational speed of the fan at cruise conditions for an engine having a fan diameter in the range of between 320 cm to 380 cm may be in the range of between 1200 rpm to 2000 rpm, for example in the range of between 1300 rpm to 1800 rpm, for example in the range of between 1400 rpm to 1600 rpm.

In use of the gas turbine engine, the fan (with the associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as the fan tip radius at the leading edge multiplied by the angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (with all units in this paragraph being $Jkg^{-1}K^{-1}/(ms^{-1})^2$). The fan tip loading may be in a closed range bounded by any two of the values in the previous sentence (i.e. the values may represent upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of): 10, 10.5, 11, 11.5, 12, 12.5, 13, 13.5, 14, 14.5, 15, 15.5, 16, 16.5, or 17. The bypass ratio may be in a closed range bounded by any two of the values in the previous sentence (i.e. the values may represent upper or lower bounds). The bypass duct may be substantially annular. The bypass duct may be radially outside the core engine. The radially outer surface of the bypass duct may be defined by a nacelle and/or a fan housing.

The overall pressure ratio of a gas turbine engine as described and claimed herein may be defined as the ratio of the stagnation pressure upstream of the fan to the stagnation pressure at the exit of the highest-pressure compressor (before entry into the combustion space). By way of non-limiting example, the overall pressure ratio of a gas turbine engine as described and/or claimed herein at cruising speed may be greater than (or on the order of): 35, 40, 45, 50, 55, 60, 65, 70, 75. The overall pressure ratio may be in a closed range bounded by any two of the values in the previous sentence (i.e. the values may represent upper or lower bounds).

Specific thrust of a gas turbine engine may be defined as the net thrust of the gas turbine engine divided by the total mass flow through the engine. At cruise conditions, the specific thrust of an engine as described and/or claimed herein may be less than (or on the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in a closed range bounded by any two of the values in the previous sentence (i.e. the values may represent upper or lower bounds). Such gas turbine engines may be particularly efficient as compared to conventional gas turbine engines.

A gas turbine engine as described and claimed herein may have any desired maximum thrust. Purely by way of non-limiting example, a gas turbine as described and/or claimed herein may be capable of producing a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust may be in a closed range bounded by any two of the values in the previous sentence (i.e. the values may represent upper or lower bounds). The thrust referred to above may be the maximum net thrust at standard atmospheric conditions at sea level plus 15 deg C. (ambient pressure 101.3 kPa, temperature 30 deg C.), with the engine being static.

In use, the temperature of the flow at the entry to the high-pressure turbine may be particularly high. This temperature, which may be referred to as TET, may be measured at the exit to the combustion space, for example immediately upstream of the first turbine vane, which itself may be referred to as a nozzle guide vane. At cruising speed, the TET may be at least (or on the order of): 1400 K, 1450 K, 1500 K, 1550 K, 1600 K or 1650 K. The TET at cruising speed may be in a closed range bounded by any two of the values in the previous sentence (i.e. the values may represent upper or lower bounds). The maximum TET in use of the engine may be, for example, at least (or on the order of): 1700 K, 1750 K, 1800 K, 1850 K, 1900 K, 1950 K or 2000 K. The maximum TET may be in a closed range bounded by any two of the values in the previous sentence (i.e. the values may represent upper or lower bounds). The maximum TET may occur, for example, at a high thrust condition, for example at a maximum take-off (MTO) condition.

A fan blade and/or aerofoil portion of a fan blade as described herein may be manufactured from any suitable material or combination of materials. For example, at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions that are manufactured by using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture device which may engage a corresponding slot in the hub (or disc). Purely by way of example, such a fixture device may be present in the form of a dovetail that may be inserted into a corresponding slot in the hub/disc and/or may engage with the same in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow for the exit area of the bypass duct to be varied during operation. The general principles of the present disclosure may apply to engines with or without a VAN.

The fan of a gas turbine engine as described and claimed herein may have any desired number of fan blades, for example 16, 18, 20, or 22 fan blades.

As used herein, cruise conditions may refer to the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at cruise condition may be any point in the range from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85, or in the range from 0.8 to 0.85. Any single speed within these ranges may be the cruise condition. For some aircrafts, the cruise conditions may be outside these ranges, for example below Mach 0.7 or above Mach 0.9.

Purely by way of example, the cruise conditions may correspond to standard atmospheric conditions at an altitude that is in the range from 10000 m to 15000 m, for example in the range from 10000 m to 12000 m, for example in the range from 10400 m to 11600 m (around 38000 ft), for example in the range from 10500 m to 11500 m, for example in the range from 10600 m to 11400 m, for example in the range from 10700 m (around 35000 ft) to 11300 m, for example in the range from 10800 m to 11200 m, for example in the range from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55 deg C.

As used anywhere herein, "cruise" or "cruise conditions" may refer to the aerodynamic design point. Such an aerodynamic design point (or ADP) may correspond to the conditions (comprising, for example, one or more of the Mach Number, environmental conditions and thrust requirement) in which the fan is designed to operate. This may mean, for example, the conditions at which the fan (or the gas turbine engine) is designed to have optimum efficiency.

During operation, a gas turbine engine as described and claimed herein may operate at the cruise conditions defined elsewhere herein. Such cruise conditions may be determined by the cruise conditions (for example the mid-cruise conditions) of an aircraft to which at least one (for example two or four) gas turbine engine may be mounted in order to provide propulsive thrust.

A person skilled in the art will appreciate that, except where mutually exclusive, a feature or parameter described in relation to any one of the above aspects may be applied to any other aspect. Furthermore, except where mutually exclusive, any feature or parameter described herein may be applied to any aspect and/or can be combined with any other feature or parameter described herein.

Now, embodiments will be described by way of example by referring to the Figures.

Herein.

Figure 1:
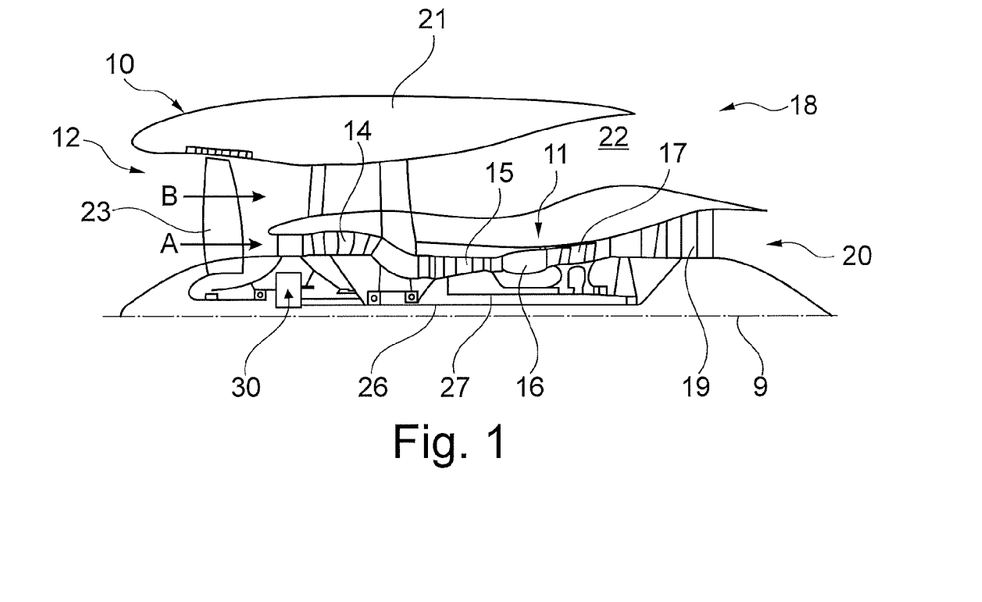
FIG. 1 shows a longitudinal section view of a gas turbine engine.

FIG. 1 describes a gas turbine engine 10 having a main rotational axis 9. The engine 10 comprises an air intake 12 and a thrust fan or fan 23 that generates two airflows: a core airflow A and a bypass airflow B. The gas turbine engine 10 comprises a core 11 that receives the core air flow A. The core engine 11 comprises, as viewed in the axial flow direction, a low-pressure compressor 14, a high-pressure compressor 15, combustion device 16, a high-pressure turbine 17, a low-pressure turbine 19, and a core engine exhaust nozzle 20. An engine nacelle 21 surrounds the gas turbine engine 10 and defines the bypass channel 22 and a bypass exhaust nozzle 18. The bypass airflow B flows through the bypass channel 22. The fan 23 is attached by means of a shaft 26 and an epicycloidal gearbox 30 at the low-pressure turbine 19 and is driven by the same. Here, the shaft 26 is also referred to as the core shaft.

During operation, the core airflow A is accelerated and compressed by the low-pressure compressor 14, and is directed into the high-pressure compressor 15 where further compression takes place. The air that is discharged from the high-pressure compressor 15 in a compressed state is directed into the combustion device 16 where it is mixed with fuel and combusted. The resulting hot combustion products are then propagated through the high-pressure and the low-pressure turbine 17,19, and thus drive them before they are discharged through the nozzle 20 for providing a certain thrust. The high-pressure turbine 17 drives the high-pressure compressor 15 by means of a suitable connecting shaft 27, which is also referred to as a core shaft. The fan 23 usually provides the greatest portion of the propulsive thrust. The epicycloidal gearbox 30 is a reduction gear.

Figure 2:
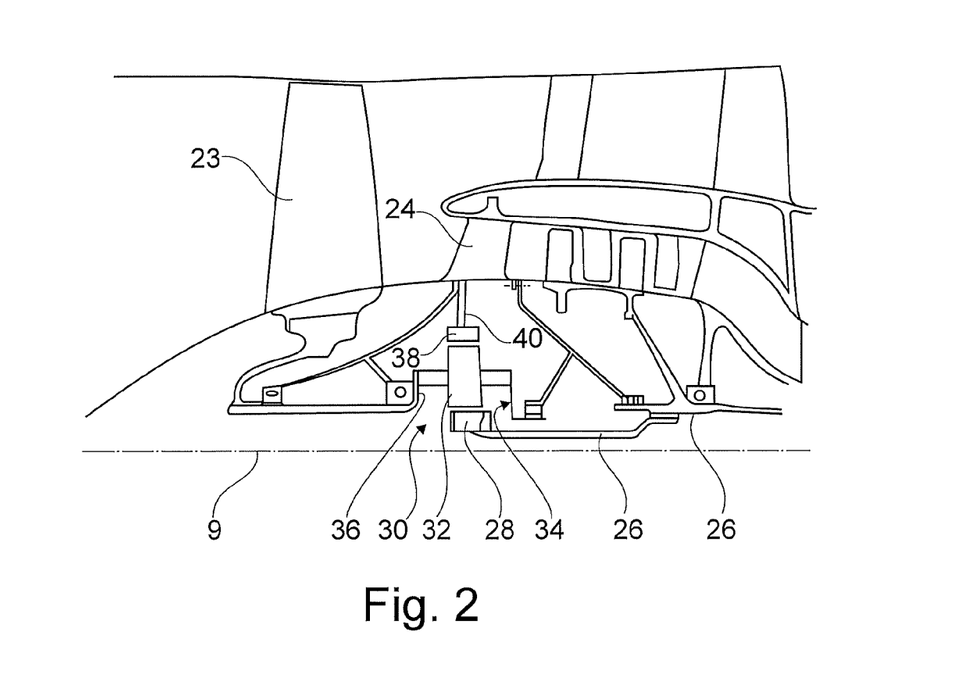
FIG. 2 shows an enlarged partial longitudinal section view of an upstream section of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicycloidal gearbox arrangement 30. Located radially outwardly of the sun gear 28 and intermeshing therewith is a plurality of planetary gears 32 that are coupled with each other by a planet carrier 34 and are respectively arranged in a rotatable manner on support elements 29 that are connected to the planetary carriers 34 in a torque-proof manner. The planetary carrier 34 limits the planetary gears 32 to rotating in synchronicity about the sun gear 28, whilst enabling each planet gear 32 on the support elements 29 to rotate about its own axis. Via linkages 36, the planetary carrier 34 is coupled to the fan 23 such that it causes its rotation about the engine axis 9. An outer gear or ring gear 38, which is coupled by means of linkages 40 to a stationary support structure 24, is located radially outside with respect to the planetary gears 32 and intermeshes therewith.

It should be noted that the terms "low pressure turbine" and "low pressure compressor" as used herein may be taken to refer to the turbine stage with the lowest pressure and the compressor stage with the lowest pressure (i.e., not including the fan 23) and/or refer to the turbine and compressor stage that are connected by the interconnecting shaft 26 with the lowest rotational speed in the engine (i.e., not including the gearbox output shaft that drives the fan 23). In some documents, "low pressure turbine" and a "low pressure compressor", which are referred to herein, may alternatively also be known as an "intermediate pressure turbine" and an "intermediate pressure compressor". Where such alternative nomenclature is used, the fan 23 may be referred to as a first or lowest pressure stage.

Figure 3:
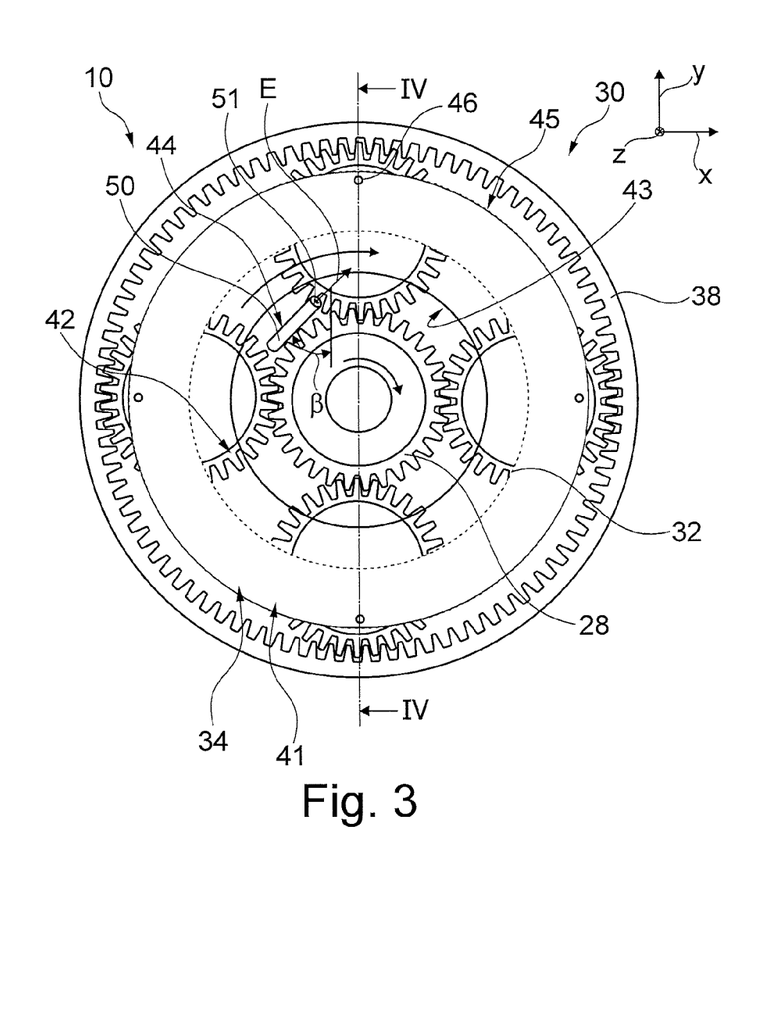
FIG. 3 shows a gearbox for a gas turbine engine in isolation.

The epicycloidal gearbox 30 is shown in FIG. 3 in more detail by way of example. The sun gear 28, planetary gears 32 and the ring gear 38 respectively have teeth at their circumference to intermesh with the other gears. However, for reasons of clarity only exemplary portions of the teeth are illustrated in FIG. 3. Although four planetary gears 32 are illustrated here, it will be apparent to the person skilled in the art that more or fewer planetary gears 32 may be provided within the scope of the claimed invention. Practical applications of a epicycloidal gearbox 30 generally comprise at least three planetary gears 32.

The epicycloidal gearbox 30 shown in FIGS. 2 and 3 by way of example is a planetary gearbox, in which the planetary carrier 34 is coupled by means of linkages 36 to the output shaft, wherein the ring gear 38 is fixedly attached. However, it is possible to use any other kind of epicycloidal gearbox 30. As a further example, the epicycloidal gearbox 30 can be a star arrangement in which the planetary carrier 34 is supported in a fixedly attached manner, wherein the ring gear (or outer gear) 38 is allowed to rotate. In such an arrangement, the fan 23 is driven by the ring gear 38. As a further alternative example, the gearbox 30 can be a differential gear which allows for the ring gear 38 as well as the planetary carrier 34 to rotate.

It is to be understood that the arrangement shown in FIGS. 2 and 3 merely represents an example, and that various alternatives are included in the scope of the present disclosure. Merely as an example, any suitable arrangement for positioning the gearbox 30 in the engine 10 and/or for connecting the gearbox 30 to the engine 10 can be used. As a further example, the connections (e.g. the linkages 36, 40 in the example of FIG. 2) between the gearbox 30 and other parts of the engine 10 (such as e.g. the input shaft 26, the output shaft, and the fixed structure 24) can have a certain degree of stiffness or flexibility. As a further example, any suitable arrangement of the bearings between rotating and stationary parts of the engine (for example between the input and the output shaft of the gearbox and the fixed structures, such as e.g. the gearbox housing) can be used, and the disclosure is not limited to the exemplary arrangement of FIG. 2. For example, it will be obvious for a person skilled in the art that the arrangement of output and support linkages and bearing positions in a star arrangement (described above) of the gearbox 30 would usually differ from those that are shown by way of example in FIG. 2.

Correspondingly, the present disclosure extends to a gas turbine engine with any desired arrangement of gearbox types (for example star arrangements or planetary arrangements), support structures, input and output shaft arrangement, and bearing positions.

Optionally, the gearbox may drive auxiliary and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass channel 22 has its own nozzle which is separate from and arranged radially outside of the engine core nozzle 20. However, this is not to be taken in a limiting manner, and any aspect of the present disclosure may also apply to engines in which the flow through the bypass channel 22 and the flow through the core 11 are intermixed or combined in front of (or upstream) a single nozzle, which may be referred to as a mixed flow nozzle. One or both nozzles may have a fixed or variable area (independently of whether a mixed or a partial flow is present). Although the described example refers to a turbofan engine, the disclosure may for example be used in any kind of gas turbine engine, such as e.g. in an open rotor (in which the fan stage is not surrounded by an engine nacelle), or a turboprop engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the view of FIG. 1). The axial, radial and circumferential directions are mutually perpendicular.

Figure 4:
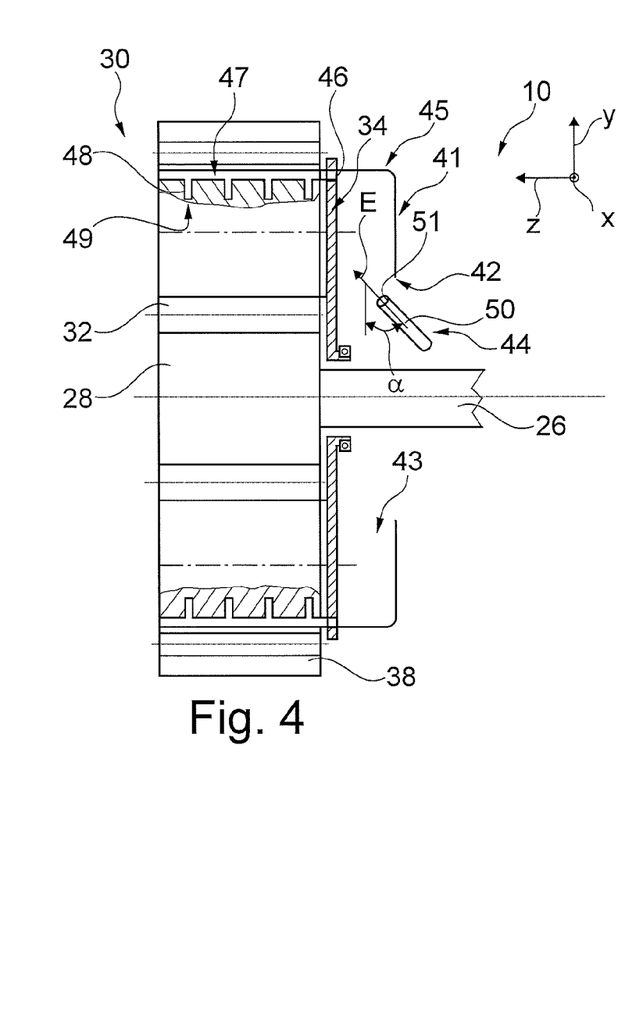
FIG. 4 shows a sectional view of the gearbox along a sectional line IV-IV that is indicated in FIG. 3.

FIG. 3 and FIG. 4 show an orientation of the gearbox 30 in its installation position inside the gas turbine engine 10 during level flight of an aircraft that is embodied with a gas turbine engine 10. On its side that is facing towards the shaft 26, the rotatable planetary carrier 34 of the gearbox 30 is formed with a rotationally symmetrical duct 41 in the manner shown more closely in FIG. 3 and FIG. 4. The duct 41 is arranged coaxially to the rotational axis of the planetary carrier 34 and the sun gear 28, and in a radially inner area 42 is embodied with an opening 43 that extends in the circumferential direction of the duct. Via the opening 43, oil can be introduced into the duct 41 from an oil supply 44 fixedly attached at the housing, starting from the radially inner diameter of the duct 41.

Starting from the oil supply 44, an introduction direction E of the oil into the duct 41 intersects with a xy-plane, and in doing so encloses an angle $\alpha$ with the radial extension direction y of the duct 41 which is in a range of between 45° and 90°, depending on the respectively present application case. Further, the introduction direction E of the oil into the duct 41 intersects with a yz-plane, and depending on the respectively present application case encloses an angle $\beta$ with the radial extension direction y that is larger than or equal to 0° and smaller than 90°. If the angle value of angle $\beta$ equals 90°, the oil is introduced into the duct 41 tangentially and in a rotational direction of the duct 41. In contrast, the introduction direction E corresponds to the y-direction if the angle $\beta$ equals 0°.

Alternatively, there is also the possibility that, starting from the oil supply 44', the introduction direction E' of the oil into the duct 41 encloses an angle $\alpha'$ with the axial extension direction z of the duct 41 that is between 60° and 90°, preferably between 75° and 90°, or between 80° and 90°, as shown in more detail in FIG. 4.

To be able to conduct the oil which is introduced into the duct 41 from the duct 41 into the area of the bearings of the planetary gears 32, the duct 41 has, in a radially outer area 45, multiple outlet openings 46 for the oil which are arranged in a manner distributed across the circumference of the duct 41. Via the outlet openings 46, the oil that is introduced through the oil supply 44 into the duct 41 with a desired impulse and which, in addition to the applied impulse, is accelerated outwards in the radial direction inside the duct 41 due to the centrifugal force that acts on the oil when the rotating planetary carrier 34 rotates, can at first be conducted out of the duct 41, and from there is conducted further via the conduit areas 47 of the planetary carrier 34 in the axial direction z of the gearbox 30. The conduit areas 47 are in operative connection with multiple tap lines 48 that extend radially inwards from the conduit areas 47 in the y-direction, with their outlet areas 49 being respectively located in the area of the bearings of the planetary gears 32.

The oil supply 44 comprises an oil nozzle 50. An outlet opening 51 of the oil nozzle 50 is arranged at a distance to the opening of the duct 41 for the oil in the y-direction or in the radial direction. The oil is discharged from the oil nozzle 50 with a defined supply pressure and, depending on the design of the outlet opening 51 of the oil nozzle 50, is injected or sprayed into the duct 41 with such an impulse that the oil flows inside the duct 41 within short operating times from the opening 43 of the duct 41 substantially in the y-direction towards the outlet openings 46 of the duct 41. The aim here is to introduce the oil via the outlet openings 46 of the duct 41 into the conduit areas 47 with such a flow velocity that a desired oil supply of the bearings of the planetary gears is ensured.

In the exemplary embodiment of the gearbox 30 shown in FIG. 3 and FIG. 4, the oil nozzle 50 is arranged above the xz symmetry plane and next to the xy symmetry plane. Alternatively, there is also the possibility of positioning the oil nozzle at the level of the x symmetry plane between the sun gear 28 and the duct 41. Further, the oil supply 44 can also have multiple oil nozzles 50, wherein respectively at least one oil nozzle can be arranged at the level of the xz symmetry plane on the one side of the sun gear 28 and substantially between the sun gear 28 and the duct 41, while the further oil nozzle is positioned on the level of the xz symmetry plane on the opposite side of the sun gear 28 substantially between the sun gear 28 and the duct 41.

With respect to the two oil nozzles that are arranged on the level of the xz symmetry plane, any further oil nozzles of the oil supply are then arranged respectively with the same distance to each other in the circumferential direction of the sun gear 28 or the duct 41 in the area between the sun gear 28 and the duct 41.

Alternatively or additionally, the sun gear, the planetary gears, and/or the ring gear can also be embodied with a duct into which oil can be introduced via a corresponding oil supply in the manner described above so as to be able to supply loads of the gearbox 30 with oil.

It is to be understood that the invention is not limited to the above-described embodiments, and that various modifications and improvements can be carried out without departing from the described concepts. Any of the features can be used either separately or in combination with any of the other features, so long as they are not mutually exclusive, and the disclosure extends to all combinations and sub-combinations of one or multiple features described herein, and includes the same.

PARTS LIST 9 main rotational axis
10 gas turbine engine
11 core
12 air intake
14 low-pressure compressor
15 high-pressure compressor
16 combustion device
17 high-pressure turbine
18 bypass thrust nozzle
19 low-pressure turbine
20 core thrust nozzle
21 engine nacelle
22 bypass channel
23 thrust fan
24 support structure
26 shaft, connecting shaft
27 connecting shaft
28 sun gear
30 gearbox, planetary gearbox
32 planetary gear
34 planetary carrier
36 linkage
38 ring gear
40 linkage
41 duct
42 radially inner area of the duct
43 opening
44 oil supply
45 radially outer area of the duct
46 outlet opening
47 conduit area
48 tap line
49 outlet area
50 oil nozzle
51 outlet opening
A core airflow
B bypass airflow
E introduction direction

The invention claimed is:

1. A gearbox comprising:
a housing;
a stationary oil supply fixedly attached at the housing;
a planetary gear arrangement including a sun gear, a plurality of planetary gears, a ring gear and a carrier,
wherein the carrier includes a duct mounted rotationally symmetrically with respect to the carrier to rotate with the carrier and respectively to the stationary oil supply, the duct including an open radially inner area into which oil is injected through air from the stationary oil supply,
wherein, starting from the oil supply, an introduction direction of the oil into the duct encloses a first angle of between 60° and 90° with respect to a radial direction,
while in a circumferential direction of the duct, the introduction direction of the oil encloses a second angle with respect to the radial direction that is larger than or equal to 0° and smaller than 90°,
wherein the duct includes a radially outer area and in the radially outer area, the duct includes at least one outlet opening for the oil, wherein a centerline of an entrance to the at least one outlet opening, at the entrance, is positioned radially outwardly of a first circle of respective centerlines of the plurality of planetary gears and on a second circle adjacent radially outwardly interior circumferences of the plurality of planetary gears,
wherein the duct includes an inlet opening for the oil at the radially inner area of the duct and the oil supply comprises at least one oil nozzle, with the outlet opening arranged at least one chosen from radially and axially distanced from the inlet opening,
wherein the at least one oil nozzle includes at least two oil nozzles which, in the installation position of the gearbox, are respectively arranged between a rotational axis of the duct and the duct as well as centrally inside the radially inner area of the duct.

2. The gearbox according to claim 1, wherein oil from the duct is conducted in a direction of at least one chosen from a bearing and a toothing via the at least one outlet opening.

3. The gearbox according to claim 1, wherein the duct includes an inlet opening for the oil at the radially inner area of the duct and the oil supply comprises at least one oil nozzle, with the outlet opening arranged at least one chosen from radially and axially distanced from the inlet opening.

4. The gearbox according to claim 3, wherein the at least one oil nozzle is, in the installation position of the gearbox, arranged centrally inside the radially inner area of the duct.

5. A gas turbine engine for an aircraft, comprising:
an engine core that comprises a turbine, a compressor, and a core shaft that connects the turbine to the compressor;
a fan that is positioned upstream of the engine core, wherein the fan comprises multiple fan blades; and
a gearbox that receives an input from the core shaft and outputs drive for the fan for driving the fan with a lower rotational speed than the core shaft, wherein the gearbox is the gearbox according to claim 1.

6. The gas turbine engine according to claim 5, wherein the turbine is a first turbine, the compressor is a first compressor, and the core shaft is a first core shaft;
the engine core further comprising a second turbine, a second compressor, and a second core shaft that connects the second turbine to the second compressor; and
wherein the second turbine, the second compressor, and the second core shaft are arranged such that they rotate with a higher rotational speed than the first core shaft.

7. The gearbox according to claim 1, wherein the first angle is between 75° and 90°.

8. The gearbox according to claim 1, wherein the first angle is between 80° and 90°.

9. A gearbox comprising:
a housing;
a stationary oil supply fixedly attached at the housing;
a planetary gear arrangement including a sun gear, a plurality of planetary gears, a ring gear and a carrier,
wherein the carrier includes a duct mounted rotationally symmetrically with respect to the carrier to rotate with the carrier and respectively to the stationary oil supply, the duct including an open radially inner area into which oil is injected through air from the stationary oil supply,
wherein, starting from the oil supply, an introduction direction of the oil into the duct encloses a first angle of between 60° and 90° with respect to a radial direction,
while in a circumferential direction of the duct, the introduction direction of the oil encloses a second angle with respect to the radial direction that is larger than or equal to 0° and smaller than 90°,
wherein the duct includes a radially outer area and in the radially outer area, the duct includes at least one outlet opening for the oil, wherein a centerline of an entrance to the at least one outlet opening, at the entrance, is positioned radially outwardly of a first circle of respective centerlines of the plurality of planetary gears and on a second circle adjacent radially outwardly interior circumferences of the plurality of planetary gears,
wherein the duct includes an inlet opening for the oil at the radially inner area of the duct and the oil supply comprises at least one oil nozzle, with the outlet opening arranged at least one chosen from radially and axially distanced from the inlet opening,
wherein the at least one oil nozzle includes at least eight oil nozzles, wherein, in an installation position of the gearbox, respectively one of the at least eight oil nozzles is arranged between a rotational axis of the duct and the radially inner area of the duct as well as centrally inside the duct, while further ones of the at least eight oil nozzles are positioned in the circumferential direction at a distance to the at least two oil nozzles centrally arranged inside the radially inner area of the duct.

10. The gearbox according to claim 9, wherein oil from the duct is conducted in a direction of at least one chosen from a bearing and a toothing via the at least one outlet opening.

11. The gearbox according to claim 9, wherein the duct includes an inlet opening for the oil at the radially inner area of the duct and the oil supply comprises at least one oil nozzle, with the outlet opening arranged at least one chosen from radially and axially distanced from the inlet opening.

12. The gearbox according to claim 11, wherein the at least one oil nozzle is, in the installation position of the gearbox, arranged centrally inside the radially inner area of the duct.

13. A gas turbine engine for an aircraft, comprising:
an engine core that comprises a turbine, a compressor, and a core shaft that connects the turbine to the compressor;
a fan that is positioned upstream of the engine core, wherein the fan comprises multiple fan blades; and
a gearbox that receives an input from the core shaft and outputs drive for the fan for driving the fan with a lower rotational speed than the core shaft, wherein the gearbox is the gearbox according to claim 9.

14. The gas turbine engine according to claim 13, wherein the turbine is a first turbine, the compressor is a first compressor, and the core shaft is a first core shaft;
the engine core further comprising a second turbine, a second compressor, and a second core shaft that connects the second turbine to the second compressor; and
wherein the second turbine, the second compressor, and the second core shaft are arranged such that they rotate with a higher rotational speed than the first core shaft.

15. The gearbox according to claim 9, wherein the first angle is between 75° and 90°.

16. The gearbox according to claim 9, wherein the first angle is between 80° and 90°.

* * * * *